(12) United States Patent
Hirase

(10) Patent No.: US 7,543,294 B2
(45) Date of Patent: Jun. 2, 2009

(54) DYNAMIC PRIORITY INHERITANCE ALGORITHM FOR SCHEDULING DYNAMIC CONFIGURABLE DEVICES

(75) Inventor: Yoshiya Hirase, Tokyo (JP)

(73) Assignee: Nokia Corporation, Espoo (FI)

( * ) Notice: Subject to any disclaimer, the term of this patent is extended or adjusted under 35 U.S.C. 154(b) by 967 days.

(21) Appl. No.: 10/740,034

(22) Filed: Dec. 18, 2003

(65) Prior Publication Data

US 2005/0060708 A1    Mar. 17, 2005

Related U.S. Application Data

(60) Provisional application No. 60/436,771, filed on Dec. 26, 2002.

(51) Int. Cl.
G06F 9/46 (2006.01)
G06F 15/00 (2006.01)
G06F 3/00 (2006.01)

(52) U.S. Cl. .......................... 718/102; 712/37; 710/10
(58) Field of Classification Search ................ 718/102; 712/37; 710/6, 7, 10
See application file for complete search history.

(56) References Cited

U.S. PATENT DOCUMENTS 5,442,789 A * 8/1995 Baker et al. ................. 718/105
5,469,571 A   11/1995 Bunnell ....................... 718/103
5,721,920 A * 2/1998 Mak et al. .................... 718/102
6,370,591 B2 * 4/2002 Kaihlaniemi ................. 719/321
6,789,132 B2 * 9/2004 Hoskins ........................ 710/5
6,834,315 B2 * 12/2004 Johnson ......................... 710/6
7,111,089 B2 * 9/2006 Karam et al. ................. 710/48

* cited by examiner

Primary Examiner—Lewis A Bullock, Jr.
Assistant Examiner—Mengyao Zhe
(74) Attorney, Agent, or Firm—Harrington & Smith, PC

(57) ABSTRACT

Disclosed is a device architecture for running applications. The device architecture includes an operating system (OS) having an OS scheduler, a Dynamic Configurable Hardware Logic (DCHL) layer comprised of a plurality of Logic Elements (LEs) and, interposed between the OS and the DCHL layer, a TiEred Multi-media Acceleration Scheduler (TE-MAS) that cooperates with the OS scheduler for scheduling and configuring the LEs of the DCHL to execute applications. In accordance with this invention, the scheduling uses inherited application priorities so that the algorithms begin to execute at the correct times, and without incurring any inefficient DCHL configuration costs. In the preferred embodiment the TEMAS is constructed to contain a Tier-1 scheduler that communicates with the OS scheduler, and at least one Tier-2 scheduler interposed between the Tier-1 scheduler and one DCHL configurable device.

15 Claims, 14 Drawing Sheets

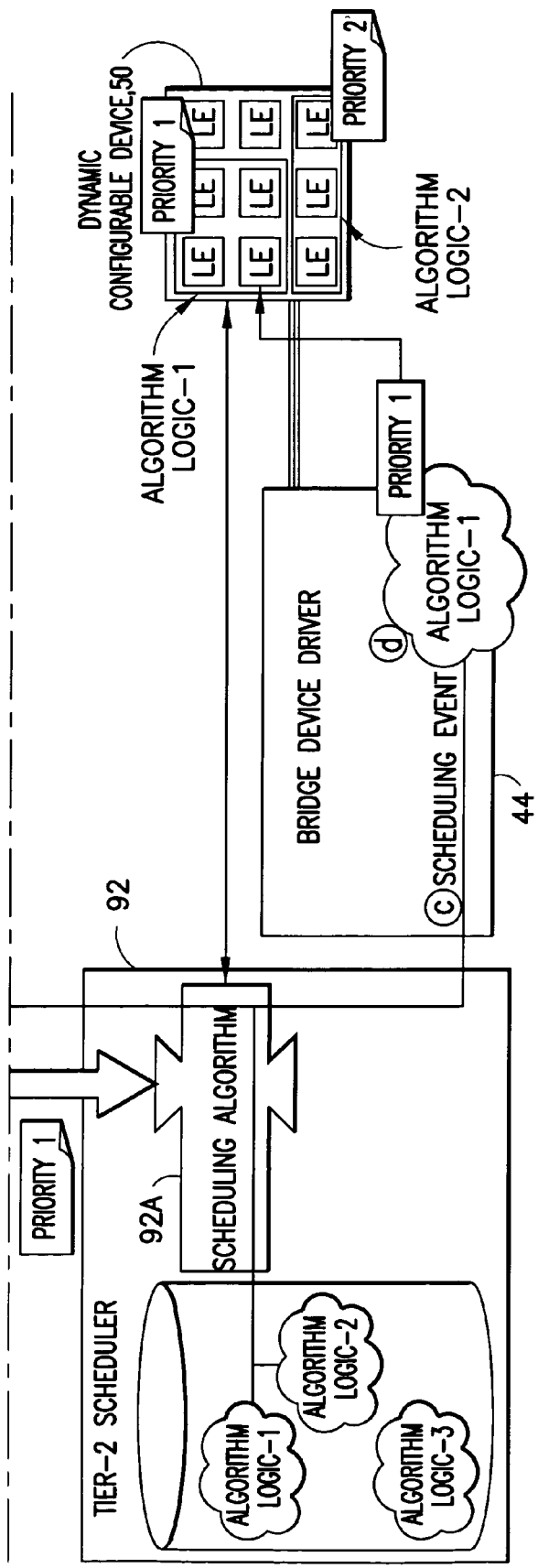

US 7,543,294 B2

DYNAMIC PRIORITY INHERITANCE ALGORITHM FOR SCHEDULING DYNAMIC CONFIGURABLE DEVICES

This patent application claims priority under 35 U.S.C. 119(e) from Provisional Patent Application No. 60/436,771, filed Dec. 26, 2002, the content of which is incorporated by reference herein in its entirety.

TECHNICAL FIELD

These teachings relate generally to computer operating systems and architectures, and more specifically relate to methods and apparatus that employ configurable hardware for implementing devices, such as handheld communicators and cellular telephones, which may be referred to as mobile terminals, and other types of user devices, such as personal digital assistants (PDAs).

BACKGROUND

Configurable hardware has not yet been implemented into commercial mobile terminals due to a lack of maturity of the technology, but future generation mobile terminals and other products are expected to require this type of hardware architecture in order to reduce power consumption and extend their functionality to new and more demanding applications, such as multi-media applications.

The conventional approach to mobile terminal design is to employ a general purpose digital signal processor (DSP) and possibly a custom integrated circuit, such as an ASIC, for the desired application(s). However, this conventional approach is proving to be less than adequate as mobile terminal applications increase in complexity and processing requirements. This is true at least for the reasons that the power consumption can be increased to the point that the power dissipation within the device becomes an important issue, and a lack of flexibility can result in wasted resources if the overall architecture must be designed to accommodate the most demanding applications.

SUMMARY OF THE PREFERRED EMBODIMENTS

The foregoing and other problems are overcome, and other advantages are realized, in accordance with the presently preferred embodiments of these teachings.

This invention provides a core algorithm for use in scheduling the timing of algorithm logic for Dynamic Configurable Hardware Logic (DCHL). The scheduling algorithm is referred to herein as "Priority Inheritance" (PI). The PI exploits the potential of DCHL to accelerate the execution of multi-media application software, as the logic utilization of DCHL is not optimum without the use of the PI in accordance with this invention. DCHL is expected to be used as a extensively adaptable hardware accelerator in mobile terminals. Multi-media applications within a host CPU will operate with appropriate algorithm logic within the DCHL to accelerate multi-media application execution, and to enhance the functionality of multi-media applications. Since applications are scheduled in accordance with such priorities, the PI is an important mechanism to achieve an optimal utilization of DCHL.

Disclosed is a device architecture for running applications. The device architecture includes an operating system (OS) having an OS scheduler, a Dynamic Configurable Hardware Logic (DCHL) layer comprised of a plurality of Logic Elements (LEs) and, interposed between the OS and the DCHL layer, a TiEred Multi-media Acceleration Scheduler (TEMAS) that cooperates with the OS scheduler for scheduling the LEs of the DCHL to execute applications.

In accordance with this invention, the scheduling uses inherited application priorities so that the algorithms begin to execute at the correct times, and without incurring any inefficient DCHL configuration costs.

In the preferred embodiment the TEMAS is constructed to contain a Tier-1 scheduler that communicates with the OS scheduler, and at least one Tier-2 scheduler interposed between the Tier-1 scheduler and one DCHL configurable device.

Also disclosed is a method to execute applications in a device. The method includes providing an OS comprising an OS scheduler and a DCHL layer comprised of a plurality of LEs; interposing between the OS and the DCHL layer TEMAS and operating the TEMAS in cooperation with the OS scheduler for scheduling the LEs of the DCHL to execute applications in accordance with inherited application priorities.

Also disclosed is a wireless communications device, such as a cellular telephone, that includes an applications layer comprising a plurality of applications; a service layer comprising an OS having an OS scheduler; a hardware layer comprising DCHL comprised of a plurality of LEs and, interposed between the OS and the DCHL in the service layer and in a node layer, the TEMAS that cooperates with the OS scheduler for scheduling the LEs of the DCHL to execute the applications in accordance with inherited application priorities.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 4A is a simplified block diagram of the TEMAS in the context of a multi-layered device architecture, and shows the TEMAS interposed between the application layer, the OS and the DCHL hardware layer, and is illustrative of a run-time framework, and FIG. 4B is a diagram that depicts an implementation example of the TEMAS;

DETAILED DESCRIPTION OF THE PREFERRED EMBODIMENTS

Figure 1:
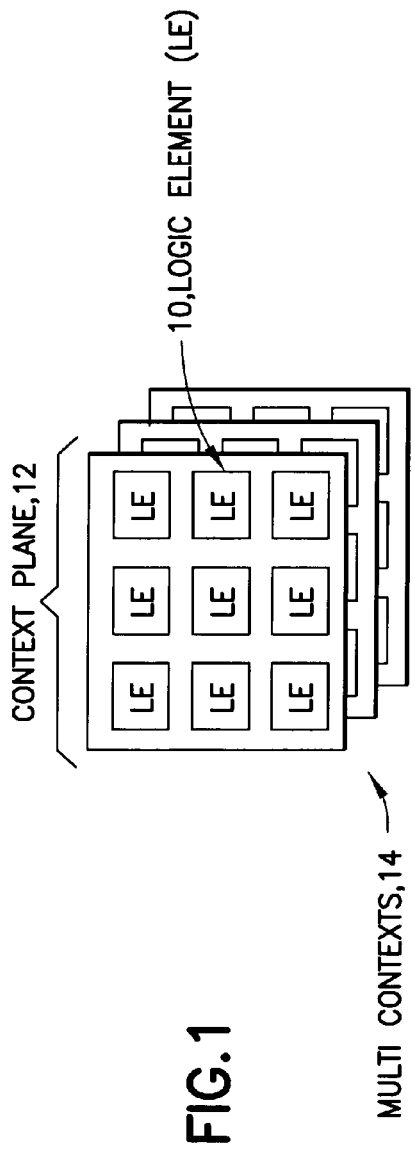
FIG. 1 is a diagram that is useful for introducing Dynamic Configurable Hardware Logic (DCHL) terminology.

One approach to overcoming the problems inherent in the use of generic DSPs and custom logic can be referred to as Dynamic Configurable Hardware Logic (DCHL). As can be seen in FIG. 1, the basic unit of the DCHL architecture is the Logic Element (LE) 10, a plurality of which are arranged in a context plane 12, or more simply a context. A plurality of context planes 12 result in a multi-context 14. The LE 10 is a unit to be configured as an algorithm logic, and an algorithm logic is assumed to include a set of LEs 10. More than one context 12 can be included in a single device, and more than one algorithm logic can be configured into one context 12, and can operate simultaneously.

Figure 2:
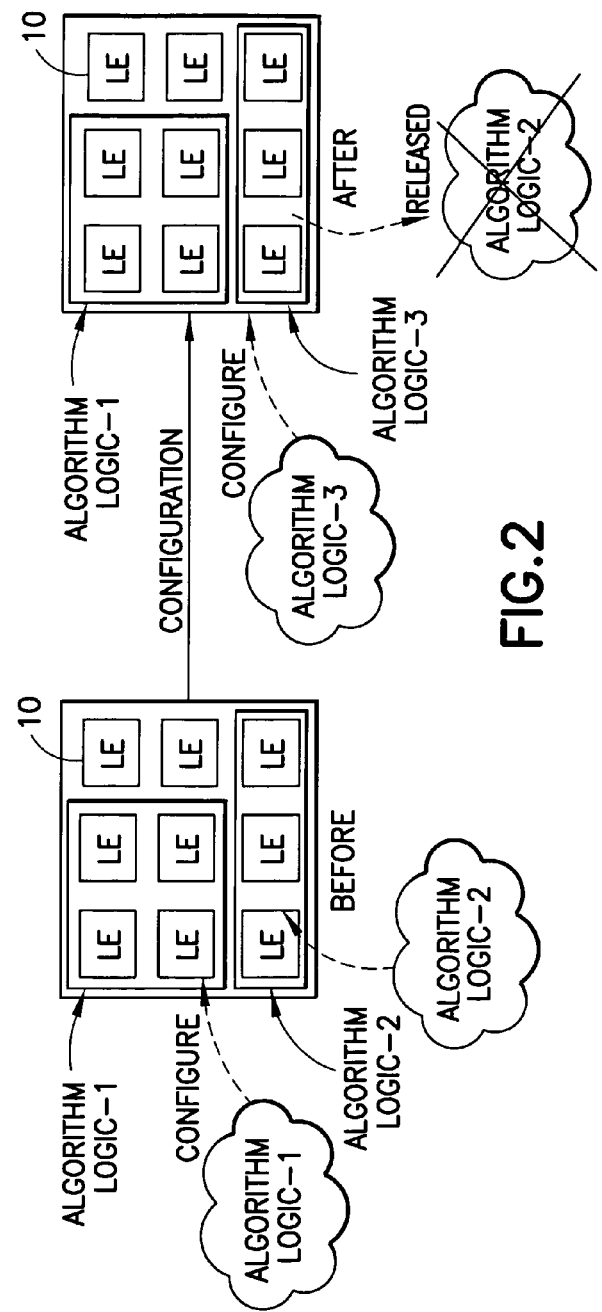
FIG. 2 shows an example of the configuration of the DCHL Logic Elements (LEs)

As is shown in FIG. 2, some LEs 10 can be configured partially (e.g., switched from algorithm logic-2 to algorithm logic-3) while other LEs 10 are operating (algorithm logic-1). One of the application logics (algorithm logic-2) is shown as being released after the configuration process.

Figure 3:
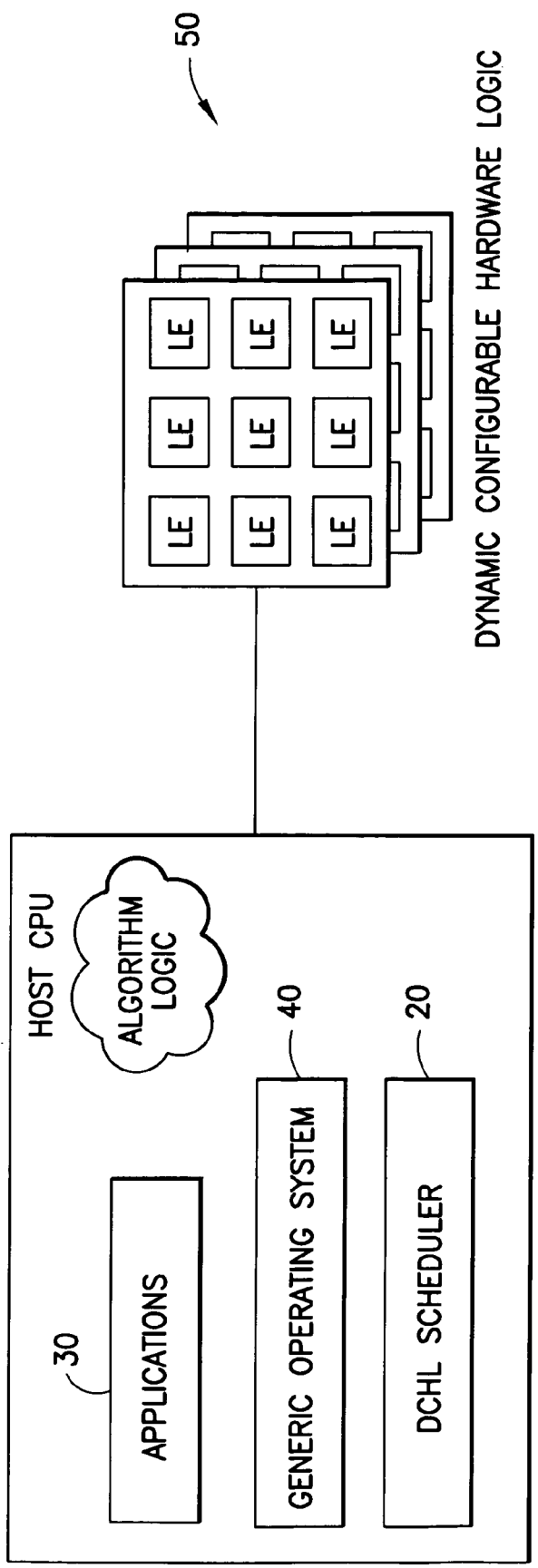
FIG. 3 shows an assumed mobile terminal DCHL-based architecture.

A mobile terminal with DCHL 50, applications 30 and a generic operating system 40 (one not optimized for use with DCHL 50, such as Linux™) has the architecture shown in FIG. 3. For example, a host CPU includes a plurality of the applications 30, the generic operating system 30, and a DCHL scheduler, also referred to herein as the TEMAS 20. This architecture employs a runtime framework of a type shown in FIG. 4 to accelerate multi-media applications by the use of algorithm logics.

Figure 4A:
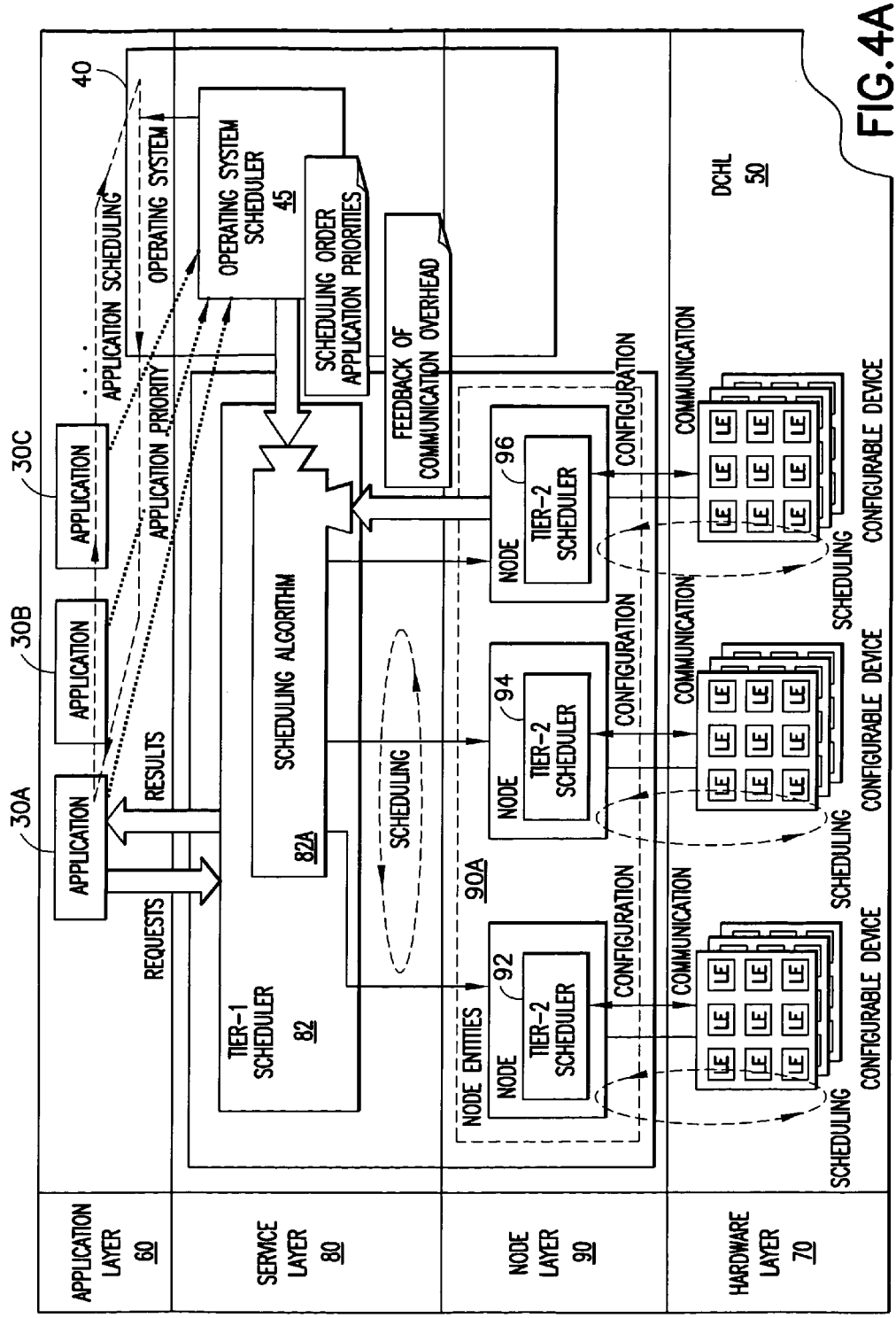
FIGS. 4A and 4B, collectively referred to as FIG. 4, show the TEMAS, where
Figure 4B:
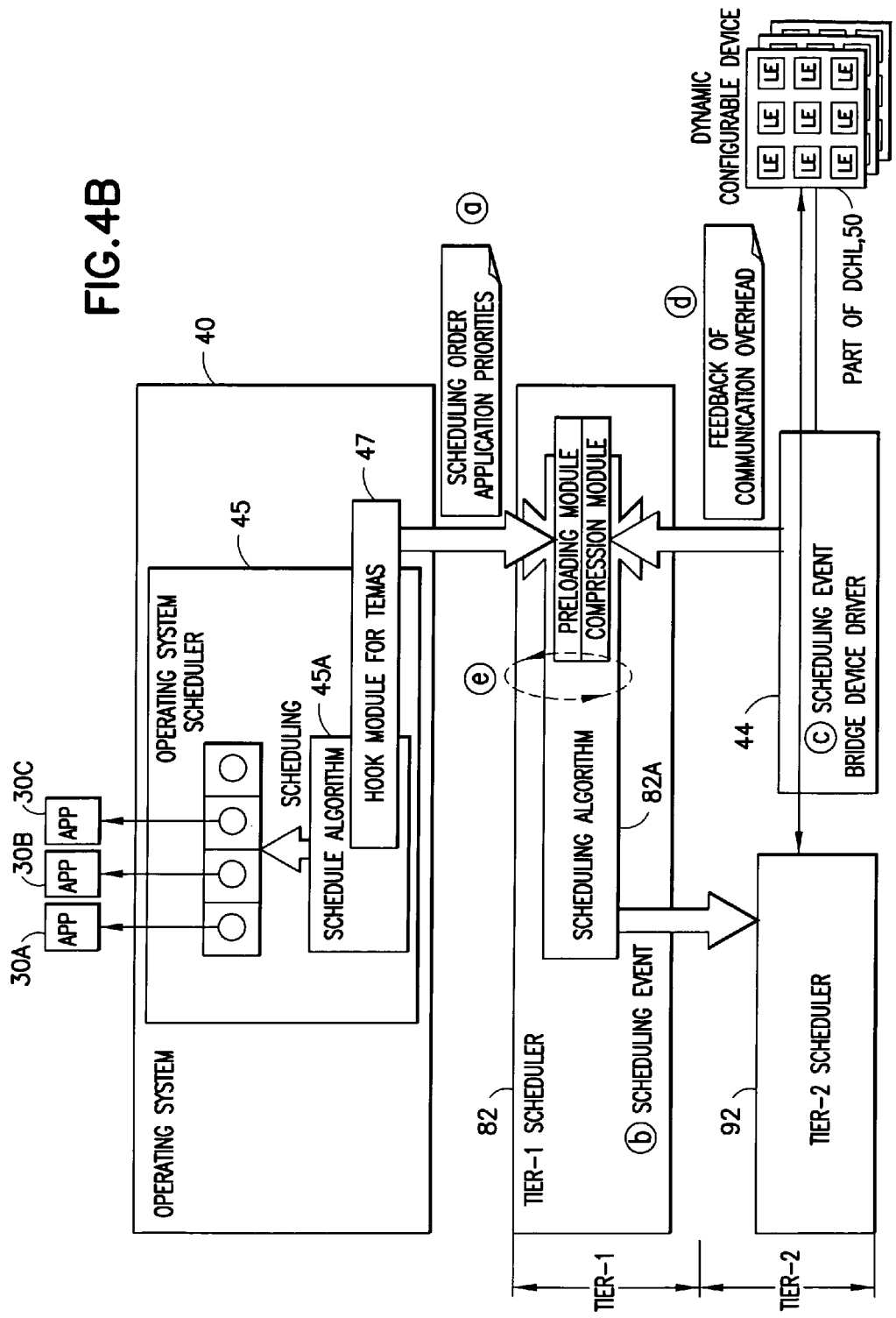
Figure 9A:
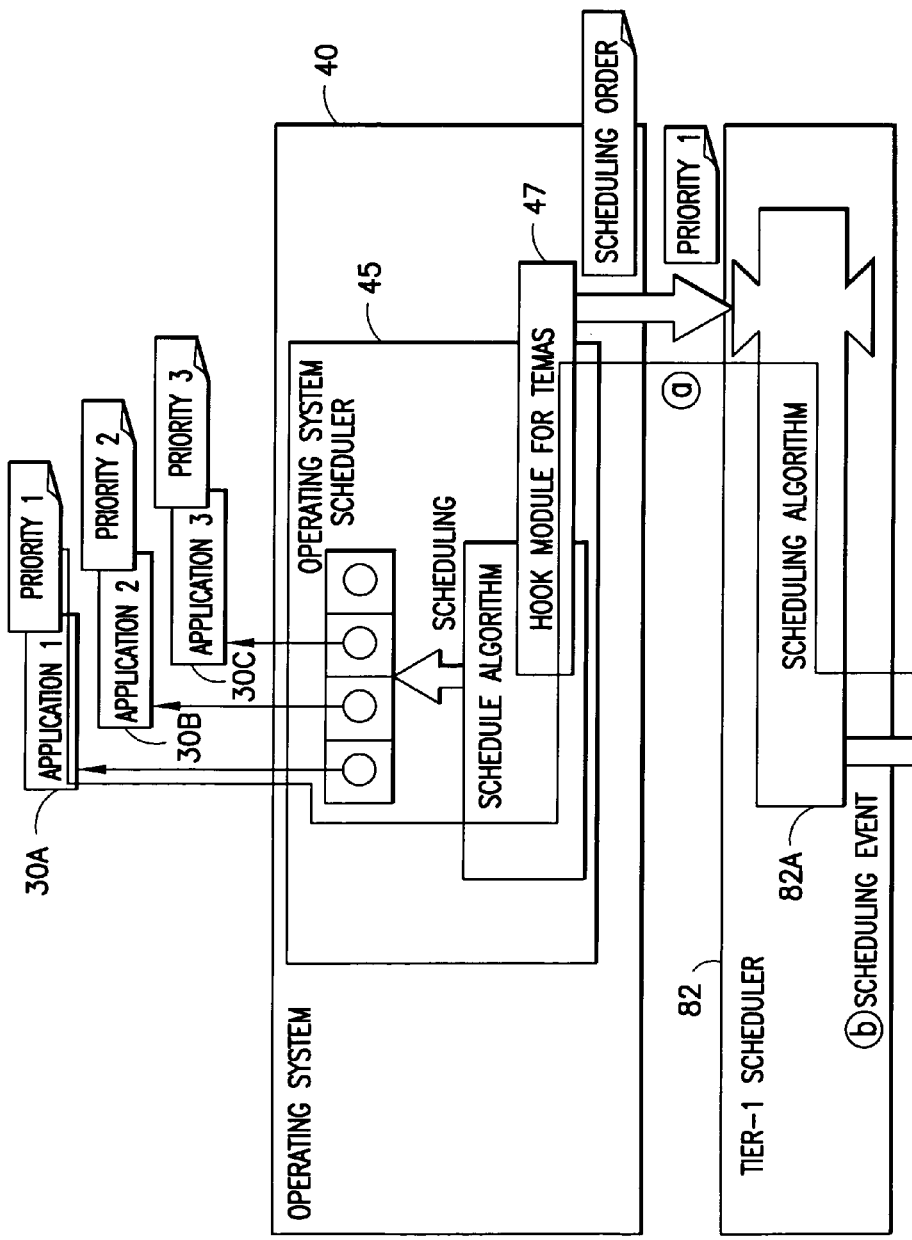
FIG. 9 shows an implementation examples of the Priority Inheritance algorithm in a DCHL-based mobile terminal.

In accordance with an aspect of an invention described in commonly assigned U.S. patent application Ser. No. 10/740,036, filed on the same date as this Patent Application and entitled: Tiered Multi-media Acceleration Scheduler Architecture for Dynamic Configurable Devices, by Yoshiya Hirase, a multi-layered scheduler, such as a two-layered scheduler, is referred to as a TiEred Multi-media Acceleration Scheduler (hereinafter TEMAS) which deals with the DCHL layer as a generic system software model. Referring to FIG. 4A, four typical device layers are shown: the application layer 60 (containing three exemplary applications 30A, 30B, 30C), a service layer 80, a node layer 90 and the hardware layer 70 (the DCHL 50 layer). The Tier-1 Scheduler 82, containing a scheduling algorithm 82A, is shown resident at the service layer 80, while a plurality of Tier-2 Schedulers 92, 94, 96 are resident at the node layer 90, one for each node entity 90A. An OS Scheduler 45, part of the OS 40, is shown resident in the service layer 80 with the Tier-1 Scheduler 82. The OS Scheduler 45 manages all applications 30 that are ordinary applications, and multi-media applications that use the DCHL 50. The Tier-1 Scheduler 82 obtains scheduling information about multi-media applications from the OS Scheduler 45, via a Hook Module 47 (shown in FIG. 4B). The most important information is the scheduling order of applications 30 and the priorities (see (a) in FIGS. 4B and 9). The scheduling order is used to decide when preloading is performed for the DCHL 50. The priority of the applications gives the actual priority of the algorithm logic to be configured into and executed on the DCHL 50 (see FIG. 5). Since the priority of the algorithm logic cannot be determined until an actual application is attached to it, this function of the Tier-1 Scheduler 82 is important (see scheduling of events (b) and (c) in FIGS. 4B and 9). The Tier-1 Scheduler 82 also obtains communication overhead from the device driver, and determines the difference in timing for the DCHL hardware (see (d) in FIG. 4B), which aids in adjusting the scheduling timing. Additional algorithms can be extended using modules (see (e) in FIG. 4B). The Tier-2 Scheduler 92, 94, 96 receives configuration requests from the Tier-1 Scheduler 82 (see (b) in FIGS. 4B and 9, as well as FIG. 5), and schedules the algorithm logic to be executed within the DCHL 50 (see (c) in FIGS. 4B and 9). As maybe apparent, the separation of the TEMAS 20 into the at least two layers (Tier-1 and Tier-2) allows any type of DCHL 50 to be compatible with the heuristic scheduler of the generic OS 40 architecture.

Figure 5:
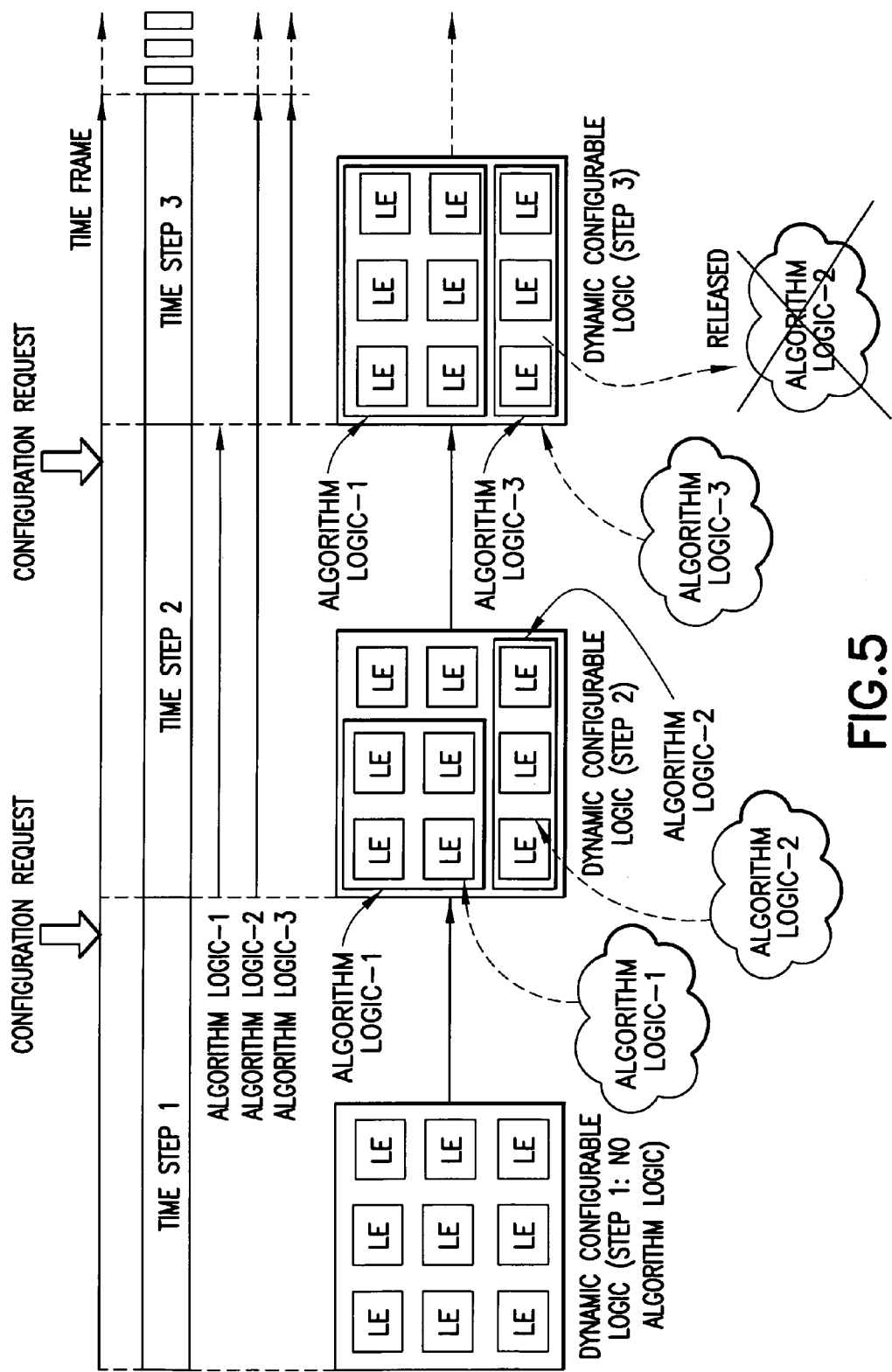
FIG. 5 shows the reconfiguration of the DCHL in response to configuration requests from the Tier-2 schedulers of FIG. 4, where the DCHL can accept more than one algorithm logic at the same time, and where a given algorithm logic can be configured into the DCHL while another one or ones are currently operating in the DCHL.
Figures 6, 6A, 6B:
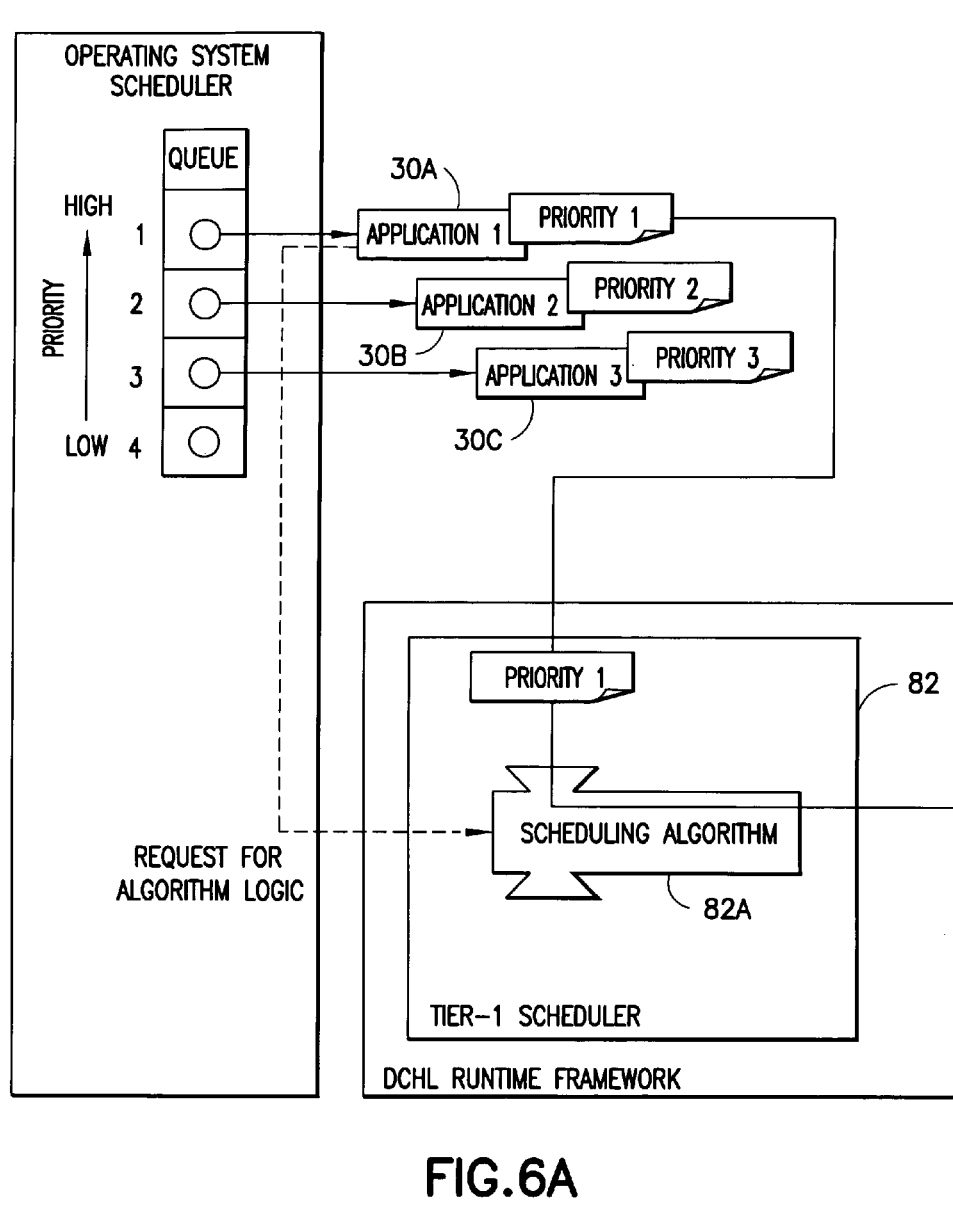
FIG. 6 is a diagram that provides an overview of the Priority Inheritance algorithm.
Figure 6B:
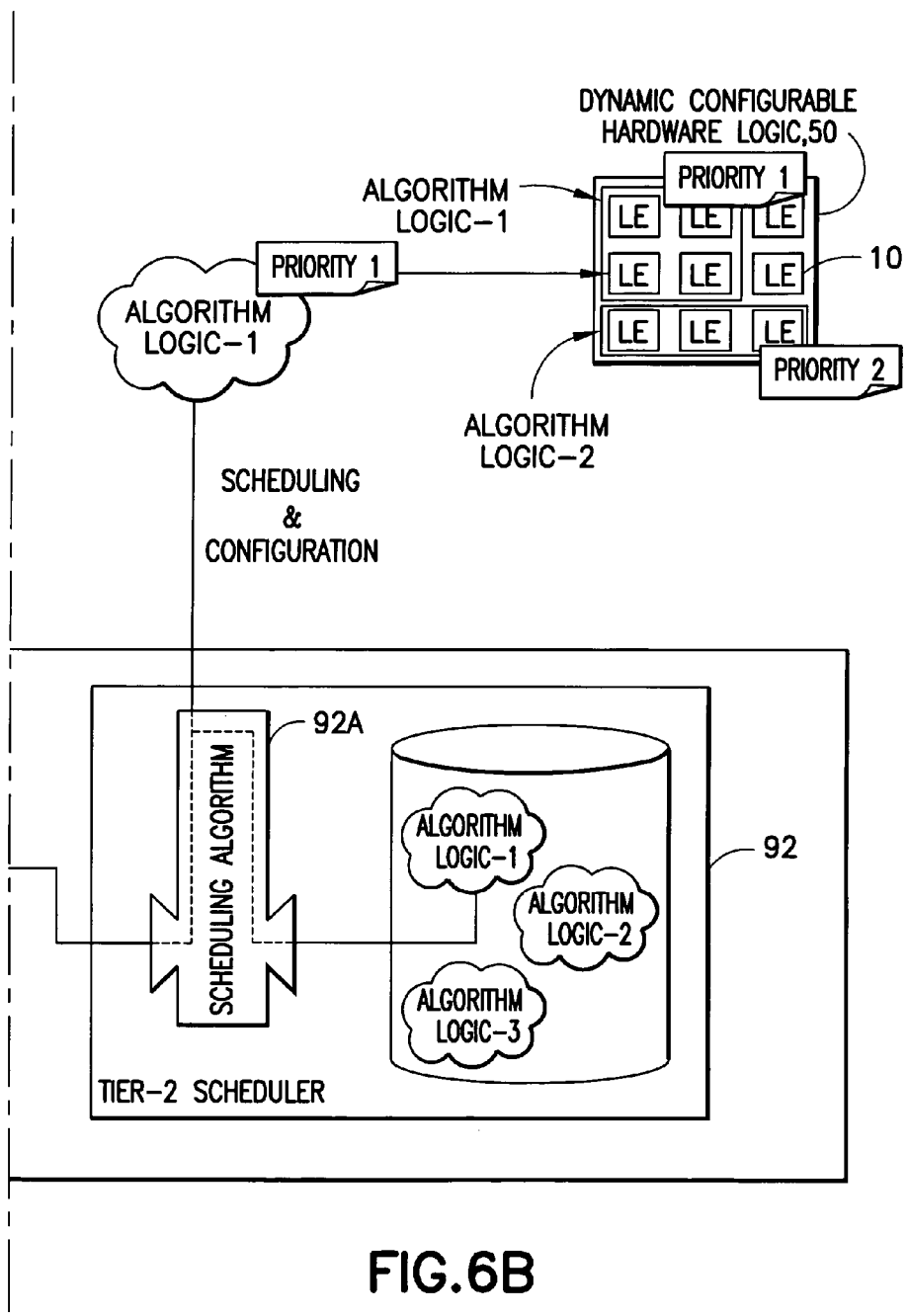

FIG. 5 shows the operation of the TEMAS 20 in response to configuration requests, that arrive during time steps, and the configuration and reconfiguration of the LEs of the DCHL 50 in accordance with various algorithm logics.

As was noted above, the OS scheduler manages all applications that are ordinary applications and multi-media applications using the DCHL 50. The priority of an application is collected from the OS Scheduler 45 by the Tier-1 Scheduler 82 via the above-referenced Hook Module 47 ((a) in FIGS. 4B and 9). The Tier-1 Scheduler 82 determines which algorithm logic is appropriate to schedule and sends a scheduling event to the Tier-2 Scheduler 92 as (b) in FIGS. 4B and 9. This triggers the Tier-2 Scheduler 92 to perform the actual scheduling of algorithm logic for DCHL as (c) in FIGS. 4B and 9, and (d) in FIG. 9.

Figure 8:
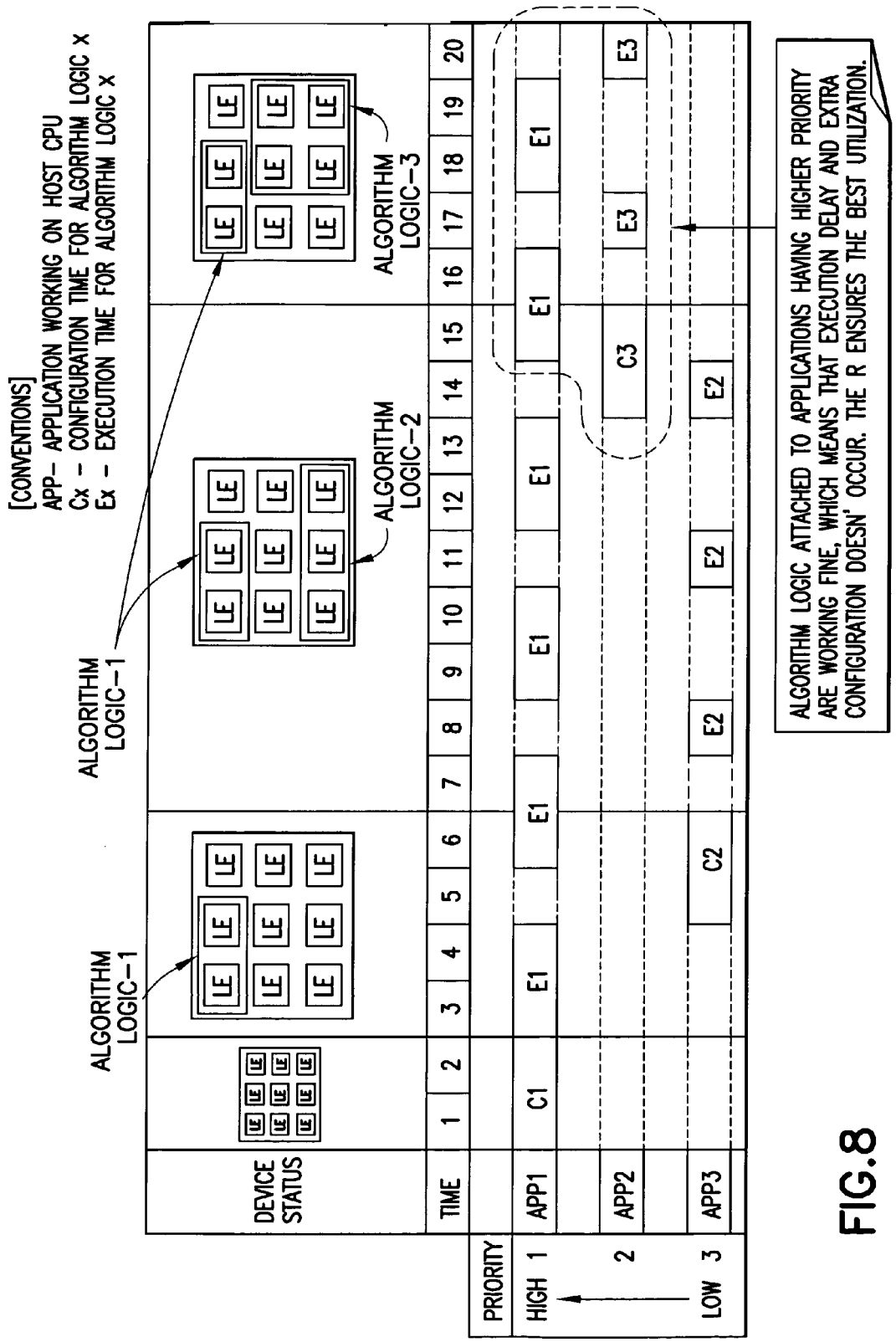
FIG. 8 shows an example of application and algorithm logic execution where there is the Priority Inheritance algorithm in accordance with this invention.

In accordance with an aspect of this invention, the Tier-2 Scheduler 92 uses the inherited priority from the application 30, as obtained from the OS Scheduler 45, to determine the optimal scheduling of the algorithm logics in the DCHL 50. Under such a system, FIG. 8 shows the operation of the application scheduling mechanism, using the PI in accordance with this invention, as will be described in further detail below.

Figure 10:
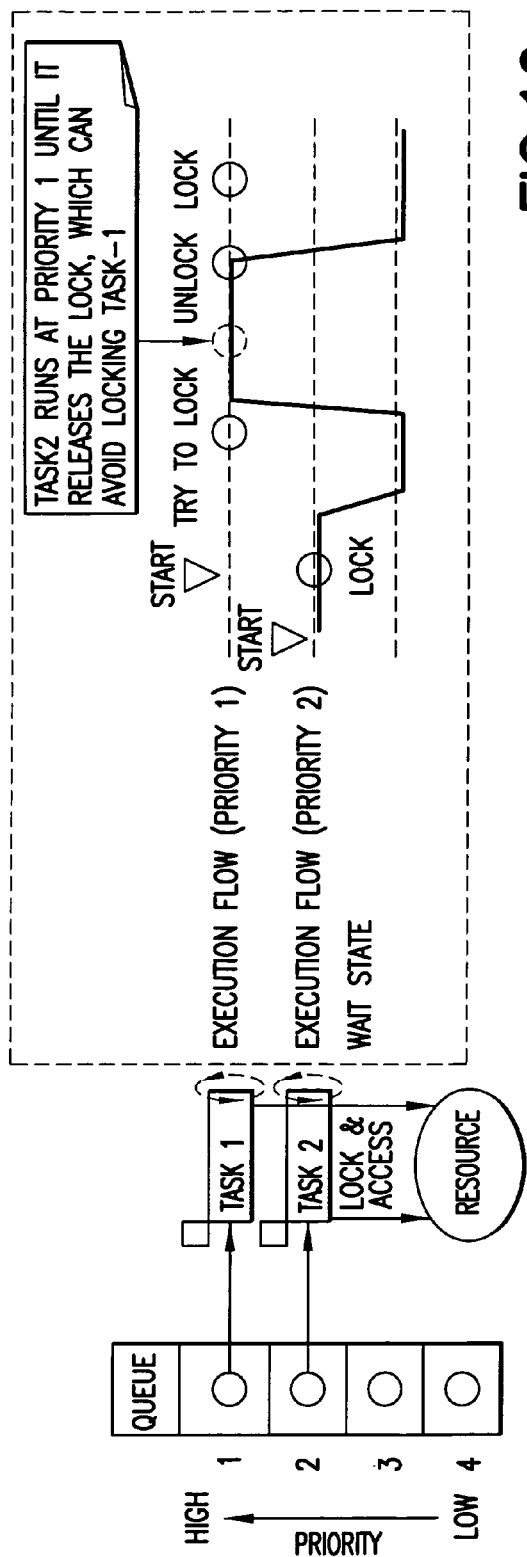
FIGS. 10, 11 and 12 are referred to when explaining conventional uses of Priority Inheritance.

Discussing the PI now in further detail, note that so-called "Priority Inheritance" algorithms are generally known. However, conventional PIs differ from this invention in several respects. A first difference is that the PI avoids a deadlock condition when managing a software resource, which enables a higher priority task to obtain control of a required resource without deadlock when the resource is already claimed by a lower priority task. The locking task is executed with the inherited higher priority until the locked resource is released (see FIG. 10). This conventional use of the PI is thus more of an attempt to manage a shared resource.

Figure 11:
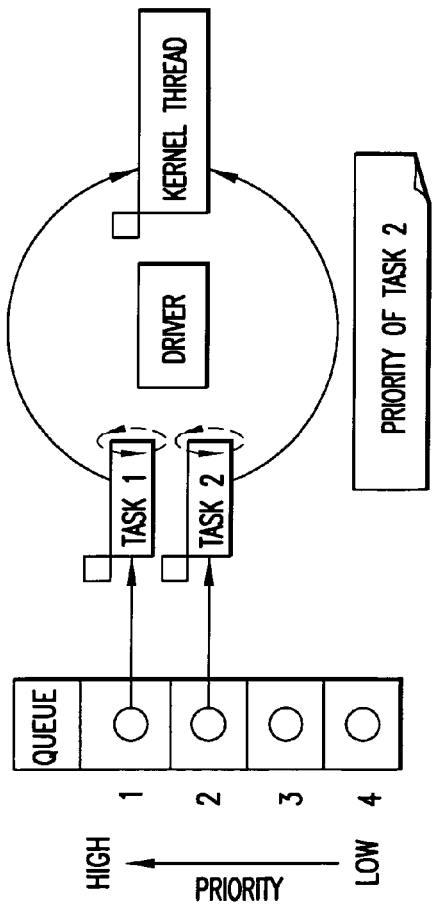
Figure 12:
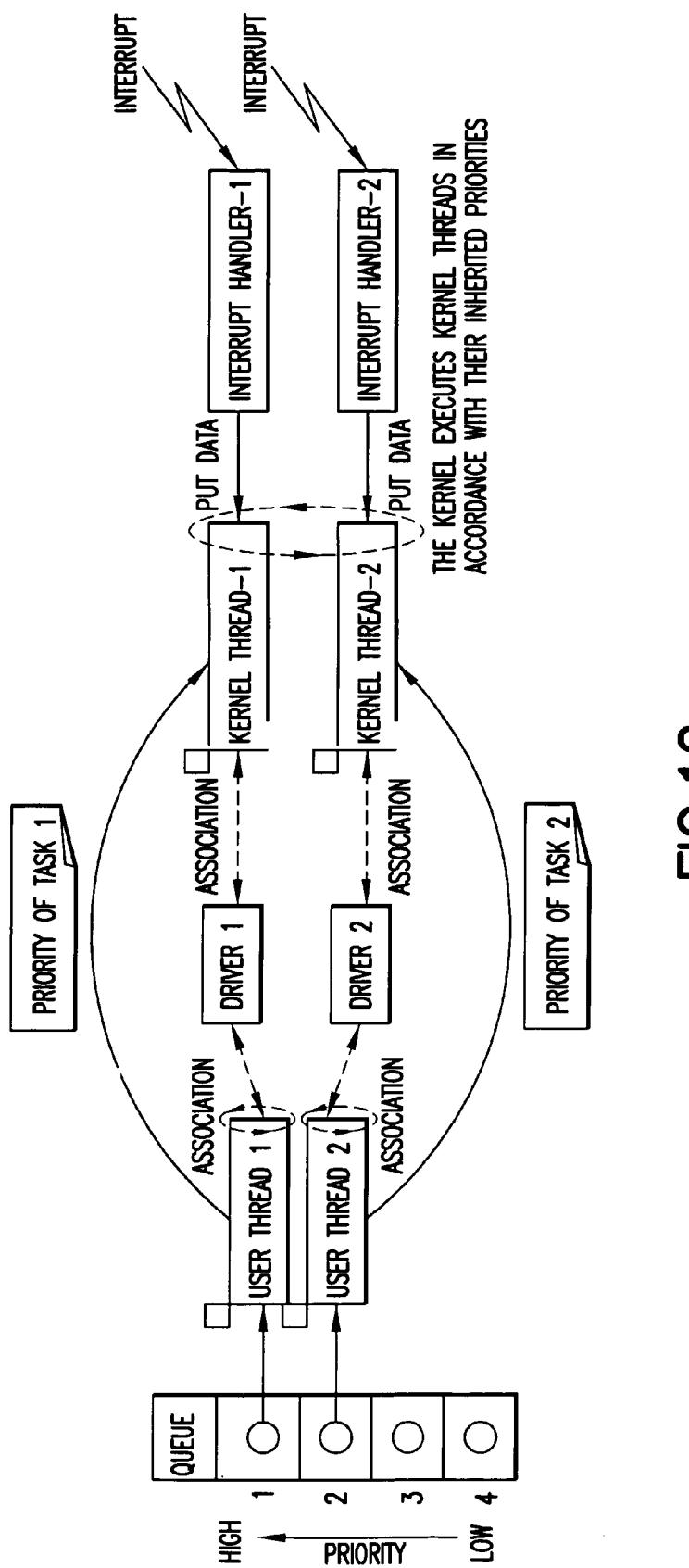

A second difference relates to enhancing the performance of device drivers (see, for example, U.S. Pat. No. 5,469,571). In this conventional case the PI allows a kernel thread handling a device driver to serve hardware interrupts in accordance with the priority of the associated user thread by inheriting the priority from the user thread (see FIGS. 11 and 12). The result is that an application having a higher priority can obtain data efficiently from the lower layer of device drivers. This use of PI is focused on the use of a decision as to what order the kernel would execute kernel threads. More particularly, and by example, if two user threads exist, and each uses a different device driver, kernel threads are created to handle the data received from the device drivers. The inherited priorities attached to kernel threads are used to decide in what order the kernel threads should be executed.

Figure 13:
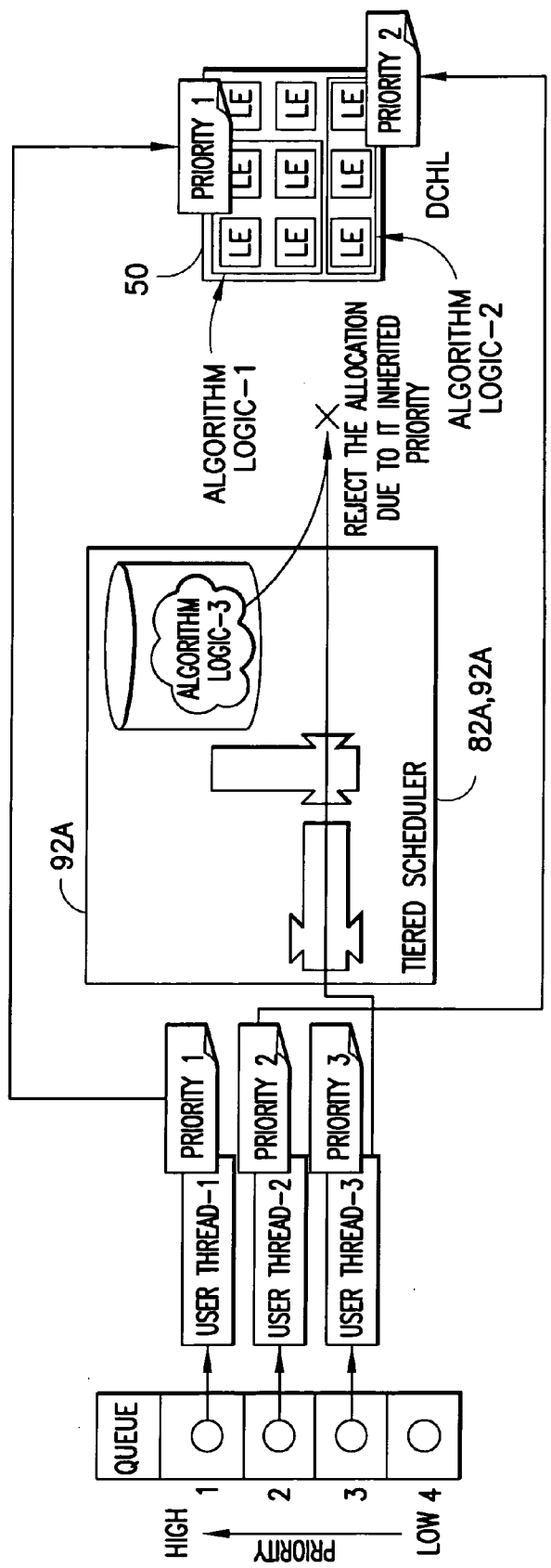
FIG. 13 illustrates the use of the Priority Inheritance algorithm of this invention in allocating optimal algorithm logics onto a DCHL resource at a correct time, and without incurring additional configuration overhead.

This also differs from the use of the PI by this invention, at least partly because the PI of this invention is directed towards allocating optimal algorithm logics onto a DCHL 50 resource at a correct time, and without incurring additional configuration overhead (see FIG. 13). In the example case where two user threads exist, and use algorithm logics already allocated in the DCHL 50, a request for allocation of a third user thread (user thread-3) may be rejected based on the inherited priority of the third user thread.

Figure 7:
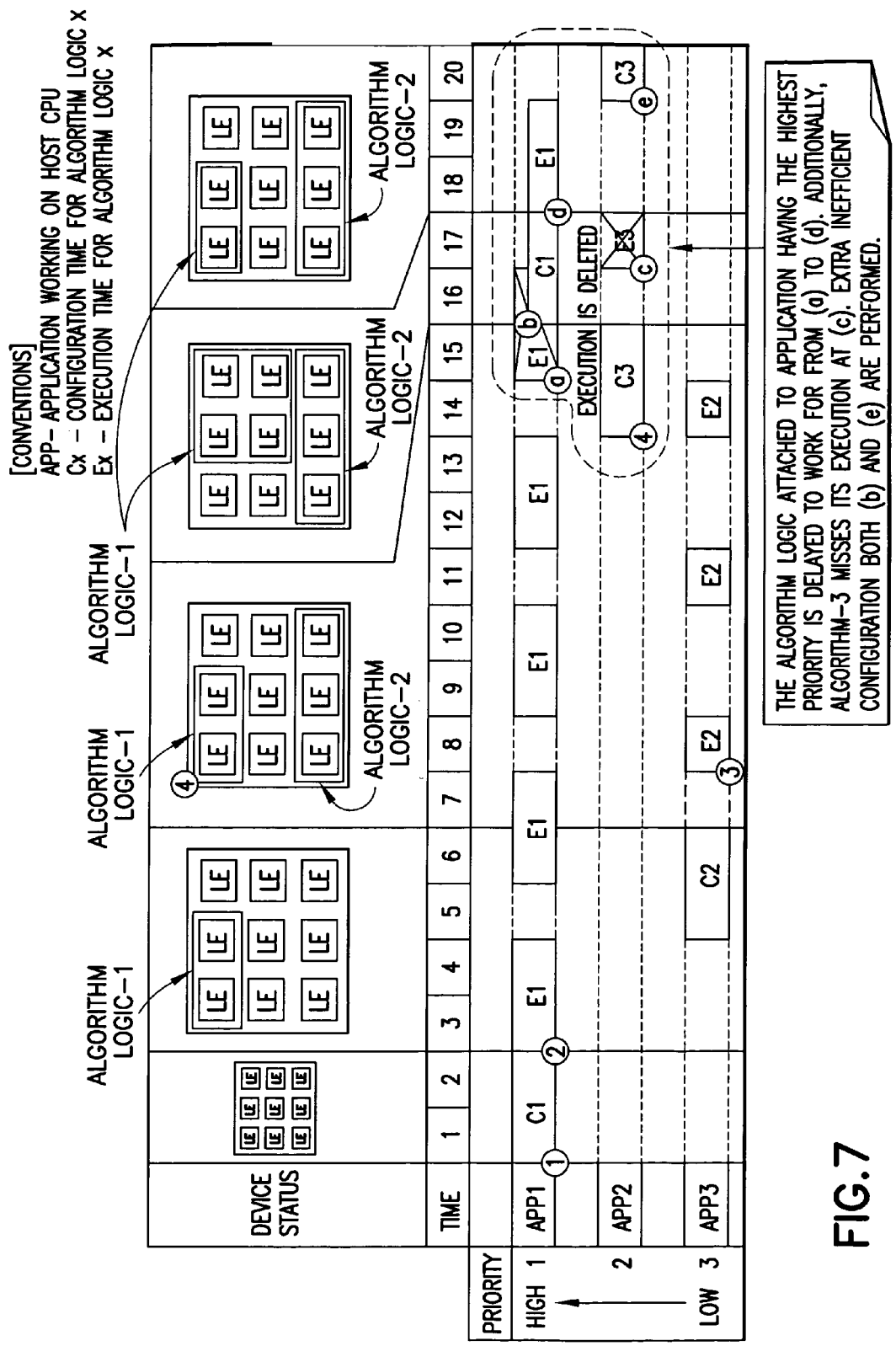
FIG. 7 shows an example of application and algorithm logic execution where there is no Priority Inheritance algorithm in accordance with this invention.

FIG. 7 is an example of how problems can occur without the use of the PI of this invention. Note that application-1 must wait (execution is delayed) from time (a) to time (d) because the additional configuration (b) that is required after the needless configuration of (4). Further, algorithm-3 misses execution at correct time (c).

More specifically, at first application-1 with priority 1 uses Algorithm Logic-1 after configuring the DCHL 50 at times (1) and (2). Next, Algorithm Logic-2 starts by requesting from application-2 with priority 2 at time (3). At this point, the DCHL 50 has two algorithm logics. Then, when application-2 with priority 2 requests additional Algorithm Logic-3 at time (4), the first loaded Algorithm Logic-1 is released to configure Algorithm Logic-3 due to the limited amount of DCHL 50 capacity. Application-1 must then wait from (a) to (d) because of the additional configuration (b) that is required after the useless configuration that was performed at time (4). And Algorithm-3 misses its execution at the correct time.

FIG. 8 shows the benefit of the PI mechanism of this invention. Since all of the priorities associated with the applications 30 are inherited by the attached algorithm logics, the scheduling for the DCHL 50 can be performed optimally. All of the algorithms begin to operate at the correct times, without incurring any inefficient configuration costs.

The foregoing description has provided by way of exemplary and non-limiting examples a full and informative description of the best method and apparatus presently contemplated by the inventor for carrying out the invention. However, various modifications and adaptations may become apparent to those skilled in the relevant arts in view of the foregoing description, when read in conjunction with the accompanying drawings and the appended claims. As but some examples, the use of other similar or equivalent operating systems, device types, application types and the like may be attempted by those skilled in the art. However, all such and similar modifications of the teachings of this invention will still fall within the scope of this invention.

Furthermore, some of the features of the present invention could be used to advantage without the corresponding use of other features. As such, the foregoing description should be considered as merely illustrative of the principles of the present invention, and not in limitation thereof.

What is claimed is:

1. A device architecture comprising:
a processor arranged to run an operating system (OS) comprising an OS scheduler;
hardware comprising a Dynamic Configurable Hardware Logic (DCHL) layer comprised of a plurality of Logic Elements (LEs); and
interposed between said OS and said DCHL layer, a TiEred Multi-media Acceleration Scheduler (TEMAS) that cooperates with the OS scheduler for scheduling the LEs of the DCHL to execute applications in accordance with inherited application priorities, where the TEMAS operates in response to configuration requests to configure and reconfigure at least some of the plurality of LEs using the inherited application priorities such that at one time a particular LE is scheduled for operation with a first algorithm logic, and at another time the same particular LE is scheduled for operation with a second, different algorithm logic, where the TEMAS is comprised of a Tier-1 scheduler that communicates with the OS scheduler to determine a difference in timing for the DCHL hardware and at least one Tier-2 scheduler interposed between the Tier-1 scheduler and one DCHL configurable device that operates in response to configuration requests from the Tier-1 scheduler.

2. A device architecture as in claim 1, where said plurality of LEs are disposed within at least one context plane.

3. A device architecture as in claim 1, comprising an application layer that comprises at least one application, a service layer that comprises said Tier-1 scheduler and said OS scheduler, a node layer that comprises said at least one Tier-2 scheduler that is coupled to a scheduling algorithm of said Tier-1 scheduler, and a hardware layer that comprises said at least one DCHL configurable device.

4. A device architecture as in claim 1, where said device comprises a device having wireless communications capability.

5. A method comprising:
providing an operating system (OS) comprising an OS scheduler and a Dynamic Configurable Hardware Logic (DCHL) layer comprised of a plurality of Logic Elements (LEs);
interposing between said OS and said DCHL layer a TiEred Multi-media Acceleration Scheduler (TEMAS); and
operating the TEMAS in cooperation with the OS scheduler for scheduling the LEs of the DCHL to execute applications in accordance with inherited application priorities, where operating the TEMAS comprises responding to configuration requests to configure and reconfigure at least some of the plurality of LEs using the inherited application priorities such that at one time a particular LE is scheduled for operation with a first algorithm logic, and at another time the same particular LE is scheduled for operation with a second, different algorithm logic, where the TEMAS is comprised of a Tier-1 scheduler that communicates with the OS scheduler to determine a difference in timing for the DCHL hardware and at least one Tier-2 scheduler interposed between the Tier-1 scheduler and one DCHL configurable device that operates in response to configuration requests from the Tier-1 scheduler.

6. A method as in claim 5, where said plurality of LEs are disposed within at least one context plane.

7. A method as in claim 5, comprising an application layer that comprises at least one application, a service layer that comprises said Tier-1 scheduler and said OS scheduler, a node layer that comprises said at least one Tier-2 scheduler that is coupled to a scheduling algorithm of said Tier-1 scheduler, and a hardware layer that comprises said at least one DCHL configurable device.

8. A method as in claim 5, executed in a device having wireless communications capability.

9. An apparatus, comprising:
an applications layer comprising a plurality of applications;
a processor arranged to run a service layer comprising an operating system (OS) having an OS scheduler;
hardware comprising a hardware layer comprising Dynamic Configurable Hardware Logic (DCHL) comprised of a plurality of Logic Elements (LEs); and interposed between said OS and said DCHL in said service layer and in a node layer, a TiEred Multi-media Acceleration Scheduler (TEMAS) that cooperates with the OS scheduler for scheduling the LEs of the DCHL to execute said applications in accordance with inherited application priorities, where operating the TEMAS comprises responding to configuration requests to configure and reconfigure at least some of the plurality of LEs using the inherited application priorities such that at one time a particular LE is scheduled for operation with a first algorithm logic, and at another time the same particular LE is scheduled for operation with a second, different algorithm logic, where the TEMAS is comprised of a Tier-1 scheduler that communicates with the OS scheduler to determine a difference in timing for the DCHL hardware and at least one Tier-2 scheduler interposed between the Tier-1 scheduler and one DCHL configurable device that operates in response to configuration requests from the Tier-1 scheduler.

10. An apparatus as in claim 9, where said plurality of LEs are disposed within at least one context plane.

11. An apparatus as in claim 9, where said apparatus comprises a cellular telephone.

12. An apparatus as in claim 9, where said apparatus comprises a wireless communications device, and where said applications comprise multimedia applications.

13. An apparatus, comprising:

a plurality of hardware logic elements;

a logic element scheduler coupled to said plurality of hardware logic elements; and an application scheduler coupled to said logic element scheduler and to an operating system scheduler, said application scheduler configured to receive information from said operating system scheduler comprising at least a scheduling order of applications and a priority of the applications and to generate and send application scheduling events to said logic element scheduler in accordance with said received information;

where said logic element scheduler responds to receipt of scheduling events to configure and reconfigure at least some of the plurality of hardware logic elements such that at one time a particular hardware logic element is scheduled for operation with a first algorithm logic for executing the first algorithm logic, and at another time the same particular hardware logic element is scheduled for operation with a second, different algorithm logic for executing the second, different algorithm logic, where said application scheduler is further configured to receive feedback of communication overhead from said logic element scheduler to use in adjusting scheduling timing for the hardware logic elements.

14. The apparatus of claim 13, where said logic element scheduler is further configured use the priority information when scheduling the application logics onto the hardware logic elements.

15. The apparatus of claim 13, embodied in a device having wireless communications capability.

* * * * *